(12) United States Patent
Chen

(10) Patent No.: US 10,588,167 B1
(45) Date of Patent: Mar. 10, 2020

(54) METHOD AND SYSTEM FOR WIRELESS COMMUNICATION

(71) Applicant: Spreadtrum Communications (Shanghai) Co., Ltd., Shanghai (CN)

(72) Inventor: Guochu Chen, Shanghai (CN)

(73) Assignee: Spreadtrum Communications (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 16/569,896

(22) Filed: Sep. 13, 2019

(30) Foreign Application Priority Data

Mar. 1, 2019 (CN) .......................... 2019 1 0154404

(51) Int. Cl.
| | |
|---|---|
| *H04B 7/00* | (2006.01) |
| *H04W 76/11* | (2018.01) |
| *H04W 76/15* | (2018.01) |
| *H04W 56/00* | (2009.01) |

(52) U.S. Cl.
CPC ........ *H04W 76/11* (2018.02); *H04W 56/0015* (2013.01); *H04W 76/15* (2018.02)

(58) Field of Classification Search
CPC .............. H04W 76/11; H04W 56/001; H04W 56/0005; H04W 72/0406; H04W 36/0055; H04W 88/08; H04W 4/80; H04W 76/27; H04W 76/19; H04W 56/00; H04W 56/0015; H04W 68/005; H04W 84/20
See application file for complete search history.

(56) References Cited

U.S. PATENT DOCUMENTS

| | | | | |
|---|---|---|---|---|
| 7,082,316 B2* | 7/2006 | Eiden | ................... | H04B 13/005 340/7.46 |
| 7,376,697 B2* | 5/2008 | Koskimies | .............. | H04L 29/06 707/999.201 |
| 9,042,829 B2* | 5/2015 | Palin | ..................... | H04W 24/00 455/41.2 |

(Continued)

FOREIGN PATENT DOCUMENTS

| CN | 102638774 A | 8/2012 |
|---|---|---|
| CN | 104488199 A | 4/2015 |

(Continued)

OTHER PUBLICATIONS

International Search Report for International Application No. PCT/CN2019/076375, dated May 23, 2019 (10 pages).

*Primary Examiner* — Nhan T Le
(74) *Attorney, Agent, or Firm* — Finnegan, Henderson, Farabow, Garrett & Dunner, LLP

(57) ABSTRACT

A method, a device group, a system, and a storage medium for wireless connection include: establishing a bidirectional connection between a wireless device group and a data source device via a group identifier; connecting any two wireless devices in the wireless device group via a preset physical identifier; establishing a first bidirectional connection between a first wireless device in the wireless device group and the data source device via the group identifier; synchronizing link information of the first bidirectional connection to a second wireless device to cause the second wireless device to establish a second bidirectional connection to the data source device; and obtaining data by respectively monitoring data transmitted from the data source device to the group identifier by the first wireless device and the second wireless device.

46 Claims, 9 Drawing Sheets

(56) References Cited

U.S. PATENT DOCUMENTS

| | | | |
|---|---|---|---|
| 9,554,061 B1* | 1/2017 | Proctor, Jr. | ............ H04N 5/268 |
| 10,117,206 B2 | 10/2018 | Zhu | |
| 10,149,262 B2 | 12/2018 | Hamauzu | |
| 2016/0105859 A1 | 4/2016 | Zhu | |
| 2016/0337996 A1 | 11/2016 | Hamauzu | |
| 2018/0103364 A1* | 4/2018 | Gholmieh | ........... H04W 40/246 |
| 2019/0044930 A1* | 2/2019 | Freudiger | ............. H04L 63/067 |

FOREIGN PATENT DOCUMENTS

| | | | |
|---|---|---|---|
| CN | 105471481 A | 4/2016 | |
| CN | 105472488 A | 4/2016 | |
| CN | 104488199 B | 11/2016 | |
| CN | 107333339 A | 11/2017 | |
| CN | 108323246 A | 7/2018 | |
| CN | 109391724 A | 2/2019 | |
| EP | 2996430 A1 | 3/2016 | |
| EP | 2996430 B1 | 1/2018 | |
| JP | 2016212656 A | 12/2016 | |
| WO | WO2015139179 A1 | 9/2015 | |

\* cited by examiner

METHOD AND SYSTEM FOR WIRELESS COMMUNICATION

CROSS-REFERENCE TO RELATED APPLICATIONS

This application is based upon and claims priority to Chinese Application No. 201910154404.9, filed on Mar. 1, 2019, the entire contents of which are incorporated herein by reference.

TECHNICAL FIELD

This disclosure relates to electronics technology, and particularly to methods, devices and systems for wireless communication.

TECHNICAL BACKGROUND

In a wireless system, data exchange may take place between a data source and various forms of wireless devices. As user demand increases, the number of wireless devices connected to the data source to exchange data may increase. In many application scenarios, transmission of data from the data source needs to be synchronized to the multiple wireless devices. For example, data transmission between an audio data source device and a group of wireless audio devices requires synchronization of music and voice between the wireless audio devices.

SUMMARY

Consistent with the present disclosure, there is provided a method for wireless connection. The method includes: establishing a bidirectional connection between a wireless device group and a data source device via a group identifier, the wireless device group comprising at least two wireless devices, the wireless device group being configured to have the group identifier, and the group identifier being used for identifying the wireless device group; connecting any two wireless devices in the wireless device group via a preset physical identifier, in which the group identifier and the physical identifier are used in a time-division manner in accordance with a preset air interface protocol; establishing a first bidirectional connection between a first wireless device in the wireless device group and the data source device via the group identifier; synchronizing, by the first wireless device, link information of the first bidirectional connection to a second wireless device in the wireless device group to cause the second wireless device to establish a second bidirectional connection to the data source device; and obtaining data by respectively monitoring data transmitted from the data source device to the group identifier by the first wireless device and the second wireless device of the any two wireless devices; in which, after a wireless device in the wireless device group transmitting data to the data source device, the method further comprises: confirming information about the obtained data by the first wireless device and the second wireless device in the wireless device group; when the second wireless device fails to receive the data source data, sending a retransmission request by the second wireless device to the first wireless device to cause the first wireless device to determine whether to retransmit the data to the second wireless device in accordance with a preset response rule; and when the first wireless device fails to receive the data source data, sending the retransmission request by the first wireless device to the second wireless device to cause the second wireless device to determine whether to retransmit the data to the first wireless device in accordance with the preset response rule.

In another aspect of the present disclosure, there is provided a group of wireless devices. The wireless device group includes: at least two wireless devices, in which: the wireless device group establishes a bidirectional connection to a data source device via a group identifier, the wireless device group being configured to have the group identifier, and the group identifier being used for identifying the wireless device group; any two wireless devices in the wireless device group are connected via a preset physical identifier, in which the group identifier and the physical identifier are used in a time-division manner in accordance with a preset air interface protocol; a first wireless device in the wireless device group establishes a first bidirectional connection to the data source device via the group identifier; the first wireless device synchronizes link information of the first bidirectional connection to a second wireless device in the wireless device group to cause the second wireless device to establish a second bidirectional connection to the data source device; the first wireless device and the second wireless device of the any two wireless devices obtain data by respectively monitoring data transmitted from the data source device to the group identifier; the first wireless device and the second wireless device in the wireless device group confirm information about the obtained data; when the second wireless device fails to receive the data source data, the second wireless device sends a retransmission request to the first wireless device to cause the first wireless device to determine whether to retransmit the data to the second wireless device in accordance with a preset response rule; and when the first wireless device fails to receive the data source data, the first wireless device sends the retransmission request to the second wireless device to cause the second wireless device to determine whether to retransmit the data to the first wireless device in accordance with the preset response rule.

In a third aspect of the present disclosure, there is provided a system for wireless transmission and reception. The device includes a data source device and a wireless device group, in which: the wireless device group establishes a bidirectional connection to a data source device via a group identifier, the wireless device group being configured to have the group identifier, and the group identifier being used for identifying the wireless device group; any two wireless devices in the wireless device group are connected via a preset physical identifier, in which the group identifier and the physical identifier are used in a time-division manner in accordance with a preset air interface protocol; a first wireless device in the wireless device group establishes a first bidirectional connection to the data source device via the group identifier; the first wireless device synchronizes link information of the first bidirectional connection to a second wireless device in the wireless device group to cause the second wireless device to establish a second bidirectional connection to the data source device; the first wireless device and the second wireless device of the any two wireless devices obtain data by respectively monitoring data transmitted from the data source device to the group identifier; the first wireless device and the second wireless device in the wireless device group confirm information about the obtained data; when the second wireless device fails to receive the data source data, the second wireless device sends a retransmission request to the first wireless device to cause the first wireless device to determine whether to retransmit the data to the second wireless device in accordance with a preset response rule; and when the first wireless device fails to receive the data source data, the first wireless device sends the retransmission request to the second wireless device to cause the second wireless device to determine whether to retransmit the data to the first wireless device in accordance with the preset response rule.

In a fourth aspect, there is provided a non-transitory computer-readable storage medium having stored thereon instructions that, when executed by a processor of a device, cause the device to perform a method of: establishing a bidirectional connection between a wireless device group and a data source device via a group identifier, the wireless device group comprising at least two wireless devices, the wireless device group being configured to have the group identifier, and the group identifier being used for identifying the wireless device group; connecting any two wireless devices in the wireless device group via a preset physical identifier, in which the group identifier and the physical identifier are used in a time-division manner in accordance with a preset air interface protocol; establishing a first bidirectional connection between a first wireless device in the wireless device group and the data source device via the group identifier; synchronizing, by the first wireless device, link information of the first bidirectional connection to a second wireless device in the wireless device group to cause the second wireless device to establish a second bidirectional connection to the data source device; and obtaining data by respectively monitoring data transmitted from the data source device to the group identifier by the first wireless device and the second wireless device of the any two wireless devices; in which, after a wireless device in the wireless device group transmitting data to the data source device, the method further comprises: confirming information about the obtained data by the first wireless device and the second wireless device in the wireless device group; when the second wireless device fails to receive the data source data, sending a retransmission request by the second wireless device to the first wireless device to cause the first wireless device to determine whether to retransmit the data to the second wireless device in accordance with a preset response rule; and when the first wireless device fails to receive the data source data, sending the retransmission request by the first wireless device to the second wireless device to cause the second wireless device to determine whether to retransmit the data to the first wireless device in accordance with the preset response rule.

BRIEF DESCRIPTION OF THE DRAWINGS

Drawings are provided herewith to assist the illustration of the methods, devices, and systems of this disclosure. The drawings include the following.

DETAILED DESCRIPTION

A group of wireless devices is established and a group identifier is provided so that bidirectional communication between the group and external device(s) may take place, in which the external device may communicate with the wireless devices individually or as a group. Bidirectional communication and data transmission between the external device and the wireless devices in the group may be synchronized. In addition, because each wireless device in the group may be communicating with the external device via the group identifier, faulty or lost connection between the external device and any wireless devices in the group will not affect the communication between the external device and other wireless devices in the group. Thus, the wireless devices within the group share an equal status with respect to communicating with the external device, resulting in more equalized power consumption among the wireless devices in the group.

Exemplary embodiments of this disclosure are provided below in conjunction with the accompanying drawings. In the description of the exemplary embodiments, terms such as "first," "second," "third," and "fourth" may be used, in the specification, claims, and drawings, to distinguish similar objects and do not necessarily describe a particular sequence or order. It should be understood that numbers used in such a manner are interchangeable in appropriate circumstances so that the example embodiments of this disclosure described herein can be implemented in a sequence other than those illustrated or described herein. Moreover, the terms "comprise," "have," and any variations thereof are meant to be non-exclusive. For example, a process, method, system, product, or device that comprises a series of steps or components is not limited to those steps or components explicitly listed; instead, it may include other steps or components not explicitly listed or inherent to the process, method, product, or device.

The exemplary embodiments described below may be combined with one another. And the same or similar concepts or processes are not necessarily repeated in some embodiments.

Figure 1:
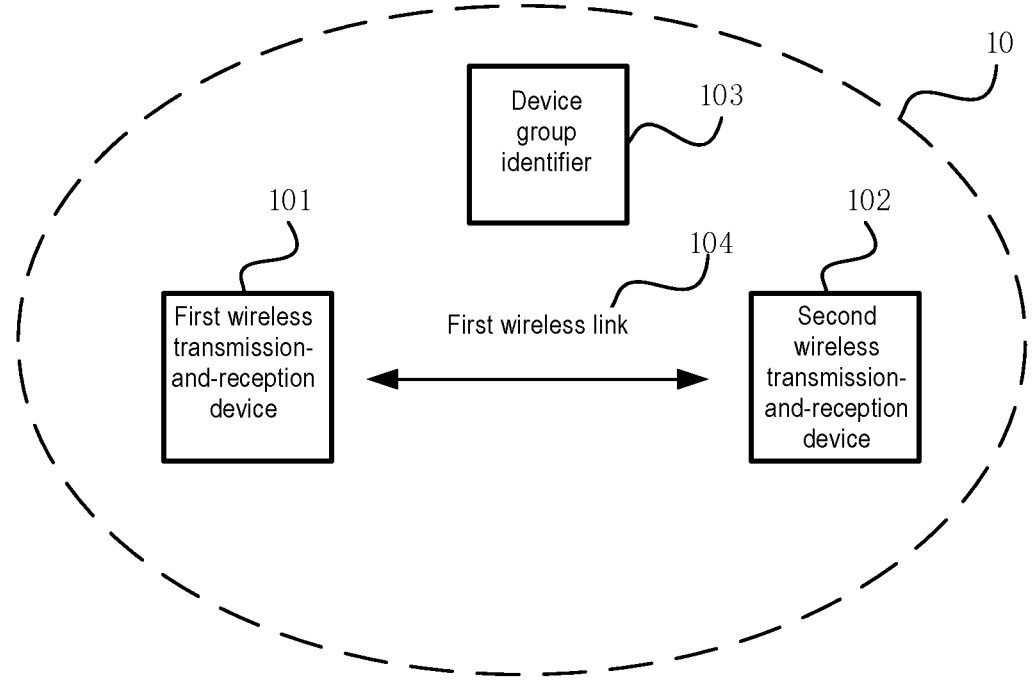
FIG. 1 is a schematic diagram of an exemplary wireless device group consistent with embodiments of this disclosure.
Figure 2:
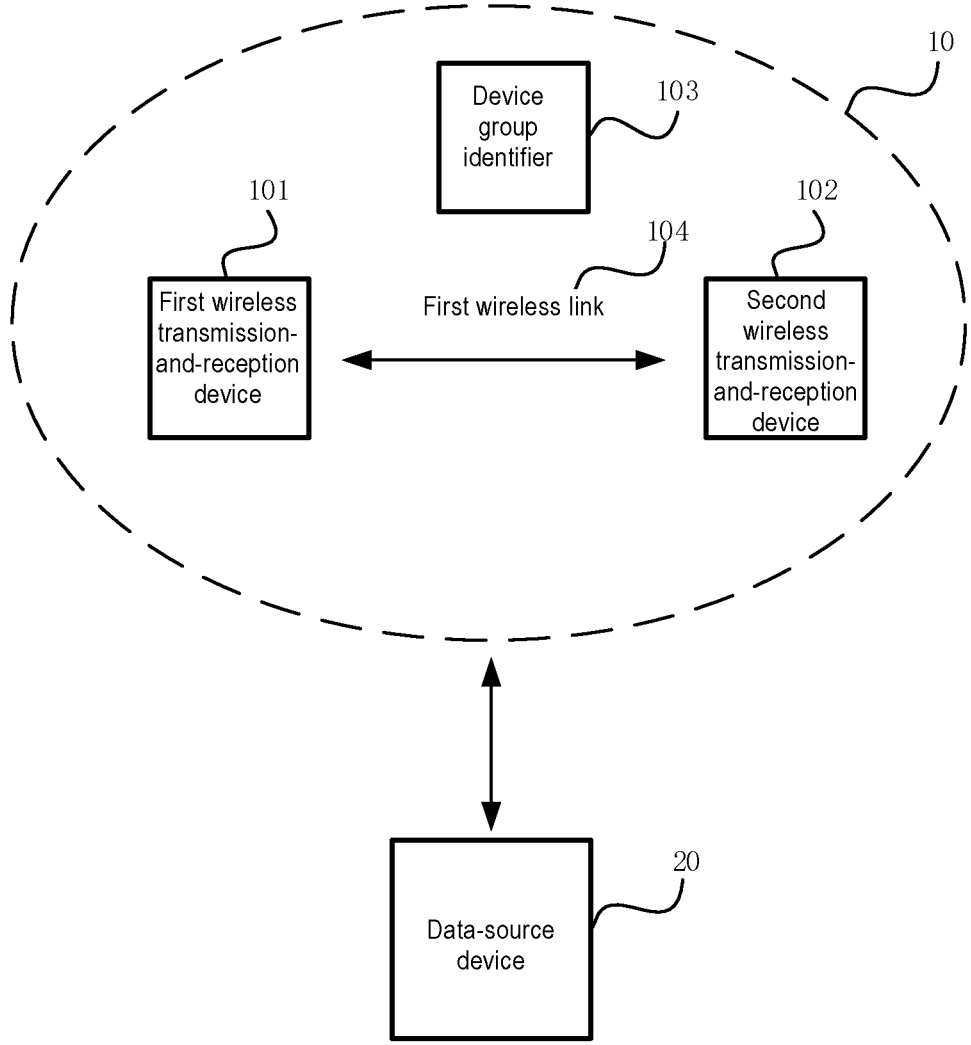
FIG. 2 is a schematic diagram of an exemplary application scenario consistent with embodiments of this disclosure.

FIG. 1 is a schematic diagram illustrating an exemplary wireless device group according to an embodiment of this disclosure. FIG. 2 is a schematic diagram illustrating an exemplary application scenario of a wireless connection method according to an embodiment of this disclosure. As shown in FIG. 1 and FIG. 2, a wireless device group 10 may include two or more wireless devices, for example, a first wireless device 101 and a second wireless device 102. In some embodiments, the wireless devices in the wireless device group 10 may communicate with each other via a first wireless link 104. The communication connection between the wireless devices in the wireless device group 10 may be bidirectional or unidirectional, and may be based on any suitable wireless protocol. Examples of wireless protocols include, without limitation, Bluetooth® or Wi-Fi or others. For convenience of illustration only, descriptions of the embodiments of this disclosure are provided below with reference to the Bluetooth® protocol, in which case the wireless devices are Bluetooth® devices, such as Bluetooth® audio devices (e.g., Bluetooth® earbuds or Bluetooth® speakers).

In some embodiments, a wireless connection method is provided herein: a wireless device group 10 may be established, and a group identifier 103 may be configured for the wireless device group 10. The group identifier 103 may be used to identify the wireless device group 10. In some embodiments, the group identifier 103 may be a communication address. For example, the group identifier 103 may be a public physical media access control (MAC) address of the wireless device group 10. In some embodiments, a bidirectional connection between an external device 20 and wireless device group 10 may be established via the group identifier 103. For example, the bidirectional connection may be a bidirectional connection based on a Bluetooth® protocol, and external device 20 may be an external data source providing audio data via the Bluetooth protocol. Data from the data source may be synchronized to the wireless devices in the wireless device group 10 via the bidirectional connection between external device 20 and the wireless device group 10, which may realize data synchronization between the wireless devices in the wireless device group 10. Further, because the wireless devices in the wireless device group 10 are connected bidirectionally to the external device 20 via the uniform group identifier 103, each wireless device in the wireless device group 10 may have an equal status. For example, when any of the wireless devices in the group has a failed connection, the communication connections between the other wireless devices in the group and the external device may not be affected. Also, because each wireless device in the group is equal, power consumption of each wireless device may be more equalized.

In some embodiments, any two wireless devices in the wireless device group 10 may be connected via a preset physical identifier. For example, the first wireless device 101 and the second wireless device 102 may be connected via physical identifiers respectively preset in each device. In some embodiments, the physical identifier may be a physical address (e.g., a MAC address). In some embodiments, the group identifier and the physical identifier may be used in a time-division manner in accordance with a preset air interface protocol.

With the development of technology, implementations of Bluetooth® audio devices gradually turn from monophonic ("mono") audio devices to stereophonic audio devices (e.g., audio devices providing two or more independent audio channels). For example, Bluetooth® earbuds may be of a variety of forms. Referring to FIG. 1, the Bluetooth® earbuds may include a first Bluetooth® earbud and a second Bluetooth® earbud, which may correspond to the first wireless device and the second wireless device, respectively. For example, there may be two example embodiments for twin Bluetooth® earbuds:

In one embodiment, one of the twin Bluetooth® earbuds may be selected as an unchanging main earbud, and the other earbud may be selected as an unchanging secondary earbud. The main earbud may be responsible for communication and interaction with the external device. In this embodiment, the workload of the main earbud may be overly excessive, and the workload distribution between the main and secondary earbuds may be uneven, in which the battery of the main earbud may drain out easily.

In another embodiment, each of the twin Bluetooth® earbuds may establish a respective standard Bluetooth® connection to the external device via MAC addresses, and the external device may transmit data information to the two earbuds, respectively. In this embodiment, the external device (e.g., a smart phone) may need to transmit the data information for twice and occupy double Bluetooth® time. However, in a complicated environment, there may be insufficient time slots available for retransmission. Or, similarly, in a scenario where a smartphone Wi-Fi connection and a Bluetooth® connection coexist, there may also be insufficient time slots available for retransmission.

In the following description, the twin Bluetooth® earbuds are used as an example of the wireless device group 10 to explain the wireless connection method provided herein. The two earbuds of the twin Bluetooth® earbuds may form a wireless device group, to which a uniform group identifier may be allocated. In some embodiments, the forming of the wireless device group with the twin Bluetooth® earbuds may be completed by a pairing operation before the earbuds leave the factory, or by a pairing operation later by a user with a pairing device. The group identifier may be generated in accordance with a Bluetooth® core specification, which will not be detailed hereinafter. The group identifier may also be generated in accordance with other specifications based on actual needs, which is not limited in this disclosure. In some embodiments, when music synchronization is being performed after the Bluetooth® earbuds are connected to a smart terminal (e.g., a smart phone, an MP3 player, a laptop computer, or any Bluetooth® device that may serve as an audio source), the smart phone may transmit audio data to the group identifier, and the twin Bluetooth® earbuds may obtain audio data by respectively monitoring an audio link between the smart phone and the group identifier. Compared with existing technologies, the two Bluetooth® earbuds in the example embodiments may have similar workloads, the power consumption of them may be more equalized, and the external device may not need to transmit data for multiple times. Moreover, by first establishing the wireless device group and then allocating a uniform group identifier to the group, the twin Bluetooth® earbuds may have a peer status. For example, when one of the Bluetooth® earbuds has a failed connection, the communication connection between the other Bluetooth® earbud and the external device may not be affected. In addition, the wireless device group may have better device extendibility. For example, according to different scenarios, a manner of grouping two earbuds may be extended to a manner of grouping more earbuds. It is understood that this disclosure has no limitation on the quantity of wireless devices included in the wireless device group 10. Further, because the wireless devices in the wireless device group 10 are connected bidirectionally to the external device 20 via the uniform group identifier 103, each wireless device in the wireless device group 10 may have an equal status. For example, when any of the wireless devices in the group has a failed connection, the communication connections between the other wireless devices in the group and the external device may not be affected. Also, because each wireless device in the group may have an equal status, the power consumption of each wireless device may be more equalized.

In some embodiments, the wireless device group 10 may also be paired Bluetooth® speakers, which may be realized similar to the twin Bluetooth® earbuds, and no redundant details will be provided hereinafter.

Figure 3:
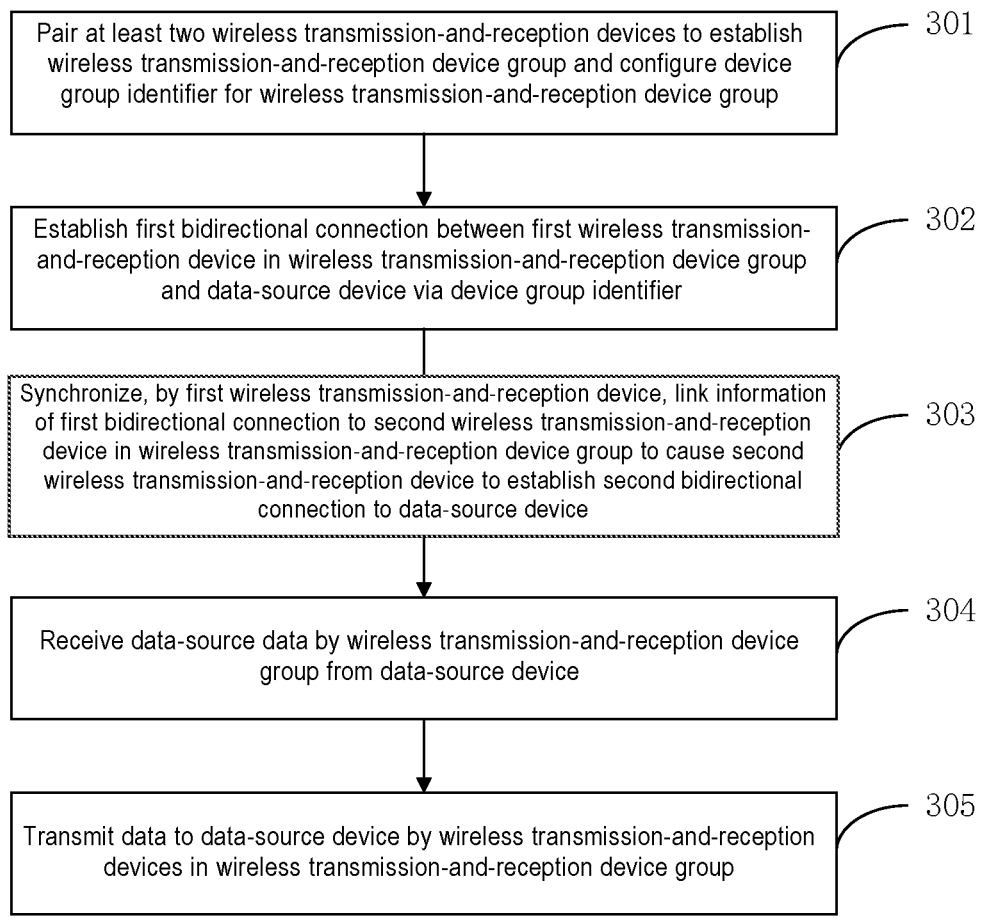
FIG. 3 is a flowchart of an exemplary wireless connection method consistent with embodiments of this disclosure.

FIG. 3 is a flowchart of an exemplary method 300 for wireless connection according to an embodiment of this disclosure. As shown in FIG. 3, the method 300 includes steps 301-305.

At step 301, at least two wireless devices are paired to establish a wireless device group, and a group identifier is configured for the wireless device group.

In some embodiments, a wireless device group may be formed by pairing a plurality of wireless devices before leaving the factory or pairing multiple wireless devices using a pairing device by a user. It is noted that this disclosure has no limitation on the method for forming the wireless device group as long as that a group identifier may be configured for the wireless device group after pairing and that the group identifier may be used to establish a bidirectional connection to an external device. In an embodiment, the aforementioned group identifier may be a communication address. In some embodiments, the group identifier may be configured for the wireless device group in accordance with a preset addressing rule.

In some embodiments, using twin Bluetooth® earbuds as an example, the twin Bluetooth® earbuds may form a wireless device group. For example, the wireless device group may be formed by pairing the twin Bluetooth® earbuds before leaving the factory or pairing the twin Bluetooth® earbuds using a pairing device by a user. In some embodiments, the group identifier may be generated in accordance with a Bluetooth® core specification, which will not be detailed hereinafter. The group identifier may also be generated in accordance with other specifications based on actual needs, which is not limited in this disclosure.

In some embodiments, after the wireless device group is established, the wireless devices in the wireless device group may also store the group identifier.

At step 302, a first bidirectional connection between a first wireless device in the wireless device group and the external device is established via the group identifier.

Figure 4:
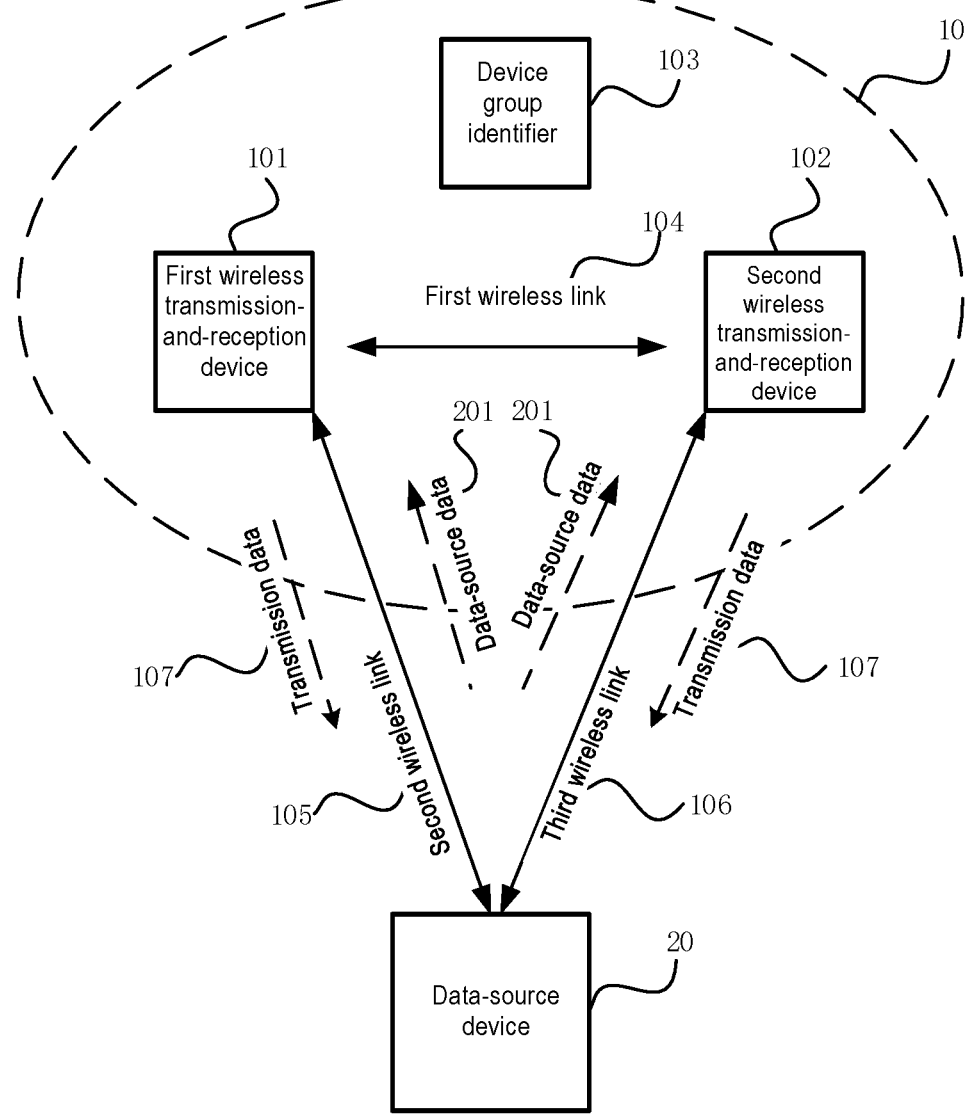
FIG. 4 is a schematic diagram of an exemplary wireless connection method consistent with embodiments of this disclosure.

In some embodiments, after forming the wireless device group, the external device may establish a connection to the wireless device group by obtaining the group identifier. FIG. 4 is a schematic diagram illustrating an exemplary communication scenario of a wireless connection method according to an embodiment of this disclosure. As shown in FIG. 4, the wireless devices in the wireless device group 10 store the group identifier 103. For example, the first bidirectional connection is established between one wireless device (e.g., a first wireless device 101) in the wireless device group 10 and the external device 20. That is, the first wireless device 101 in the wireless device group 10 transmits data bidirectionally via the group identifier 103 to the external device 20 via a second wireless link 105. In some embodiments, the selection of the first wireless device 101 in the wireless device group 10 for establishing a connection to the external device 20 may be determined in accordance with the current status of each wireless device in the group. For example, the wireless device having the most battery power or the strongest signal may be selected. This disclosure does not have limitation on bases for selecting the wireless device for establishing a first connection to the external device.

In some embodiments, using twin Bluetooth® earbuds as an example, after two Bluetooth® earbuds form a set of twin Bluetooth® earbuds, a smart terminal may obtain the group identifier for establishing a connection to the twin Bluetooth® earbuds. The group identifier may have been stored in the twin Bluetooth® earbuds. In an embodiment, a first bidirectional connection may be established between one of the twin Bluetooth® earbuds (e.g., a first Bluetooth® earbud) and the smart terminal. That is, the first Bluetooth® earbud of the twin Bluetooth® earbuds may transmit data bidirectionally via the group identifier to the smart terminal via a second wireless link. In some embodiments, the selection of the first Bluetooth® earbud of the twin Bluetooth® earbuds to establish the connection to the smart terminal may be determined in accordance with a status of each earbud in the group. For example, the Bluetooth® earbud having the most battery power or the strongest signal may be selected. This disclosure does not have limitation on the bases for selecting the Bluetooth® earbud establishing a connection to the smart terminal.

Referring back to FIG. 3, at step 303, the first wireless device synchronizes link information of the first bidirectional connection to a second wireless device in the wireless device group to cause the second wireless device to establish a second bidirectional connection to the external device.

In some embodiments, after the first wireless device 101 establishes the first bidirectional connection to the external device 20 via the group identifier 103, the link information of the first bidirectional connection may be further synchronized via the first wireless link 104 to a second wireless device 102 in the wireless device group 10 to cause the second wireless device 102 to establish a second bidirectional connection to the external device. That is, the second wireless device 102 in the wireless device group 10 may transmit data bidirectionally via the group identifier 103 to the external device 20 via a third wireless link 106.

In some embodiments, using twin Bluetooth® earbuds as an example, after the first Bluetooth® earbud establishes the first bidirectional connection to the smart terminal via the group identifier, the link information of the first bidirectional connection may be further synchronized via the first wireless link to a second Bluetooth® earbud of the twin Bluetooth® earbuds to cause the second Bluetooth® earbud to establish a second bidirectional connection to the smart terminal. That is, the second Bluetooth® earbud of the twin Bluetooth® earbuds may transmit data bidirectionally via the group identifier to the external device via a third wireless link.

At step 304, data may be received by the wireless device group from the external device.

In some embodiments, after the wireless device group 10 establishes a bidirectional connection to the external device 20 via the group identifier 103, the external device 20 may transmit data 201 to the group identifier 103 corresponding to the wireless device group 10. In some embodiments, data 201 may be audio data, video data, text data, or other data. This disclosure does not have limitation on the specific form of the data. For example, when the wireless devices are Bluetooth® audio devices, the data may be audio data.

In an embodiment, the first wireless device 101 and the second wireless device 102 may obtain the data by respectively monitoring data 201 transmitted from the external device 20 to the group identifier 103.

In some embodiments, using twin Bluetooth® earbuds as an example, after the twin Bluetooth® earbuds establish a bidirectional connection to the smart terminal via the group identifier, the smart terminal may transmit audio data to the group identifier corresponding to the twin Bluetooth® earbuds. In an embodiment, the first Bluetooth® earbud and the second Bluetooth® earbud may obtain data by respectively monitoring the audio data transmitted from the smart terminal to the group identifier.

In some embodiments, for enabling the twin Bluetooth® earbuds to play the audio in synchronization, a time label may be set in the audio data to cause the two Bluetooth® earbuds to play the same audio data according to the time label.

At step 305, data is transmitted to the external device by the wireless devices in the wireless device group.

In some embodiments, after the wireless device group 10 receives data 201 from the external device 20, the wireless devices (e.g., the first wireless device 101 and the second wireless device 102) in the wireless device group 10 may respectively transmit data 107 to the external device 20.

In some embodiments, the data 107 may include response data for successful reception or response data for failed reception. For example, when a wireless device successfully receives data 201, the device may send response data indicating successful reception to the external device 20. The response data indicating successful reception may be acknowledgment (ACK) data, for example. When a wireless device fails to receive data 201, the device may send response data indicating failed reception to the external device 20. The response data indicating failed reception may be negative acknowledgment (NACK) data, for example. It is noted that the wireless devices in the wireless device group 10 may also send other data to the external device 20 according to needs of actual working conditions. This disclosure does not have limitation on the specific form of the data.

In some embodiments, using twin Bluetooth® earbuds as an example, when one of the twin Bluetooth® earbuds successfully receives the audio data, it may send response data indicating successful reception to the smart terminal. When one of the Bluetooth® earbuds fails to receive the audio data, it may send response data indicating failed reception to the smart terminal. It is noted that the earbuds in the twin Bluetooth® earbuds may also send other data to the smart terminal according to needs of actual working conditions. This disclosure does not have limitation on the specific form of the smart terminal.

Figure 5:
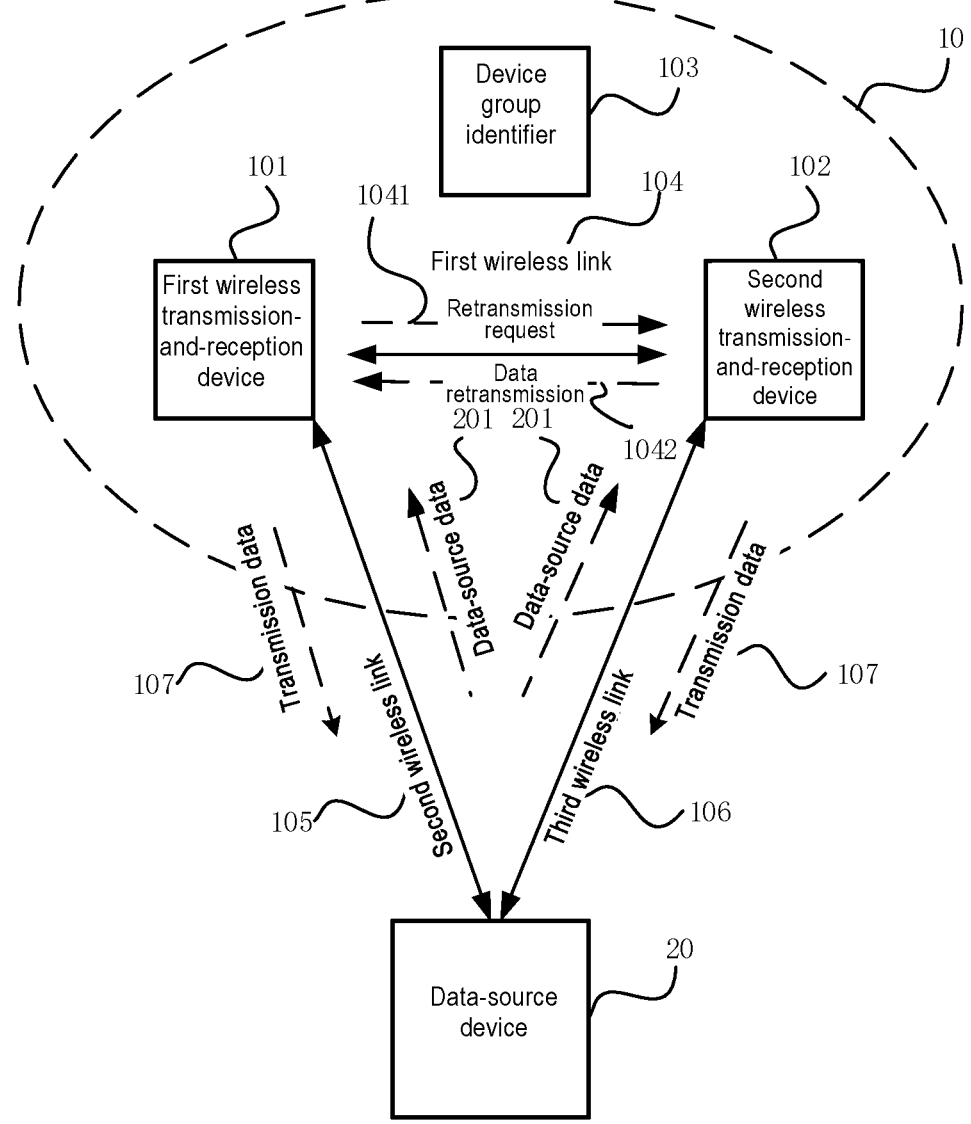
FIG. 5 is a schematic diagram of another exemplary wireless connection method consistent with embodiments of this disclosure.

FIG. 5 is a schematic diagram illustrating another example communication scenario of a wireless connection method according to an embodiment of this disclosure. As shown in FIG. 5, a wireless device in the wireless device group 10 may lose data packet. However, once the reception time slot has been missed, the external device 20 may not resend data 201. In some embodiments, for avoiding data asymmetry among the wireless devices caused by data packet loss of the wireless devices in the wireless device group 10, information about the obtained data may be confirmed within the group after the wireless device group 10 receives data 201. For example, information about the obtained data may be confirmed on the first wireless device 101 and the second wireless device 102 of the wireless device group 10. For example, whether the first wireless device 101 and the second wireless device 102 have the same quantity of data packets may be confirmed. However, this disclosure does not have limitation on the specific confirmation method.

In some embodiments, when the second wireless device 102 fails to receive data 201, the second wireless device 102 may send a retransmission request 1041 to the first wireless device 101 to cause the first wireless device 101 to determine whether to perform data retransmission 1042 to the second wireless device 102 in accordance with a preset response rule. Similarly, when the first wireless device 101 fails to receive data 201, the first wireless device 101 may also send a retransmission request to the second wireless device 102 to cause the second wireless device 102 to determine whether to perform data retransmission to the first wireless device 101 in accordance with the preset response rule.

In some embodiments, using twin Bluetooth® earbuds as an example, when the second Bluetooth® earbud fails to receive the audio data, the second Bluetooth® earbud may send a retransmission request to the first Bluetooth® earbud to cause the first Bluetooth® earbud to determine whether to retransmit data to the second Bluetooth® earbud in accordance with a preset response rule. Similarly, when the first Bluetooth® earbud fails to receive the audio data, the first Bluetooth® earbud may also send a retransmission request to the second Bluetooth® earbud to cause the second Bluetooth® earbud to determine whether to retransmit audio data to the first Bluetooth® earbud in accordance with the preset response rule.

Figure 6:
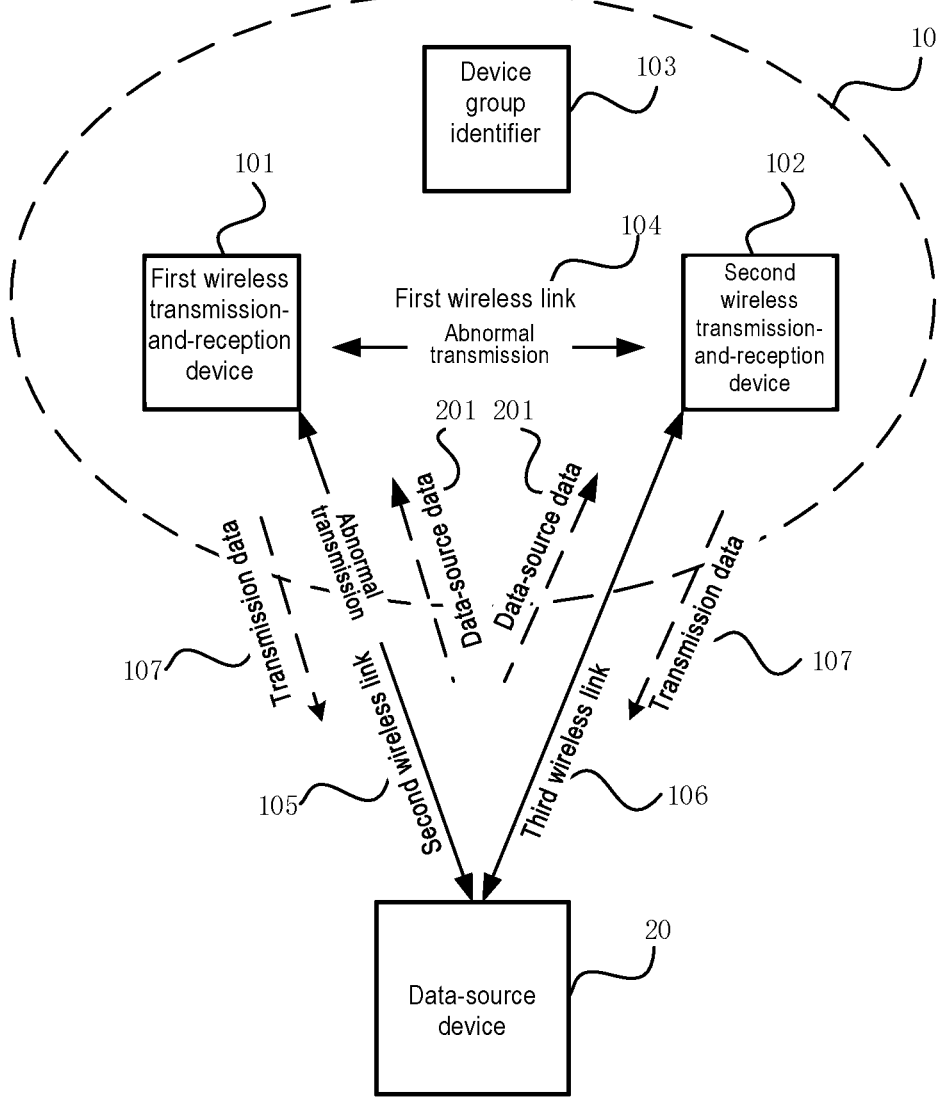
FIG. 6 is a schematic diagram of yet another exemplary wireless connection method consistent with embodiments of this disclosure.

FIG. 6 is a schematic diagram illustrating yet another example communication scenario of a wireless connection method according to an embodiment of this disclosure. As shown in FIG. 6, a wireless device in the wireless device group 10 experiences abnormality. For example, the first wireless device 101 malfunctions or has a power failure, during when the transmission is abnormal between the first wireless device 101 and the external device 20 and between the first wireless device 101 and the second wireless device 102. However, because the wireless devices in the wireless device group 10 are connected bidirectionally to the external device 20 via the uniform group identifier 103, each wireless device in the wireless device group 10 may have an equal status. When any wireless device (e.g., the first wireless device 101) in the group has a failed connection, the communication connections between the other wireless devices (e.g., the second wireless device 102) in the group and the external device 20 may not be affected.

Figure 7:
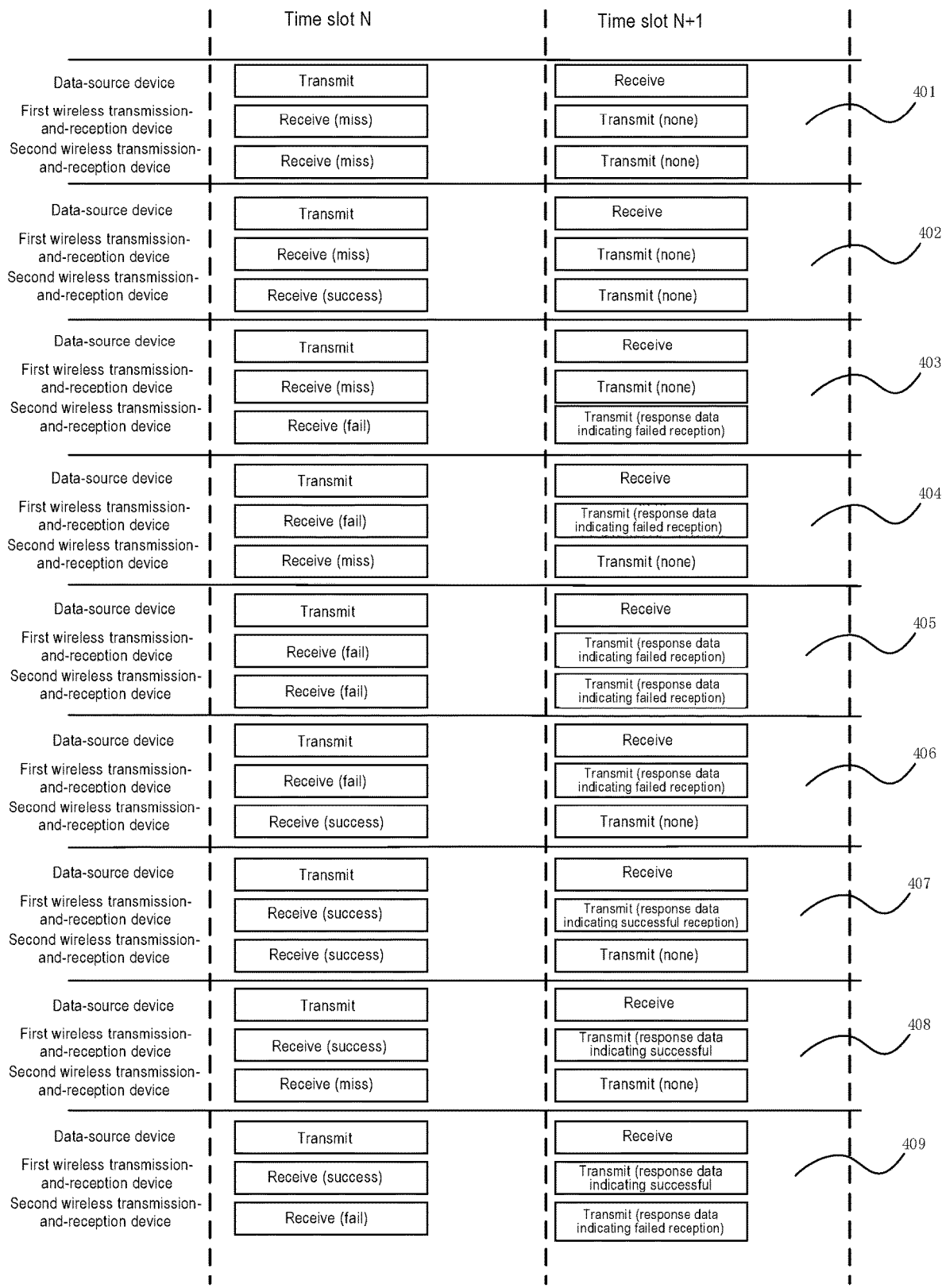
FIG. 7 is a schematic diagram illustrating an exemplary sequence of data transmission between a wireless device group and a data source device consistent with embodiments of this disclosure.

FIG. 7 is a schematic diagram illustrating an exemplary time series of data transmission between a wireless device group and an external device. As shown in FIG. 7, a time slot N and a time slot N+1 are two adjacent time slots, and a data transmission-or-reception event may occur between every two adjacent time slots. Referring back to FIG. 4, the second wireless link 105 is used for bidirectional data transmission between the first wireless device 101 and the external device 20, and the third wireless link 106 is used for bidirectional data transmission between the second wireless device 102 and the external device 20.

In Event 401, in time slot N, both the first wireless device 101 and the second wireless device 102 miss the reception of data 201. In time slot N+1, neither the first wireless device 101 nor the second wireless device 102 sends feedback data to the external device 20.

In Event 402, in time slot N, the first wireless device 101 misses the reception of data 201, but the second wireless device 102 successfully receives data 201. In time slot N+1, neither the first wireless device 101 nor the second wireless device 102 sends feedback data to the external device 20.

In Event 403, in time slot N, the first wireless device 101 misses the reception of data 201, while the second wireless device 102 fails to receive data 201. In time slot N+1, the first wireless device 101 does not send feedback data to the external device 20, while the second wireless device 102 sends response data indicating failed reception to the external device 20.

In Event 404, in time slot N, the first wireless device 101 fails to receive data 201. In time slot N+1, the second wireless device 102 misses the reception of data 201. In time slot N+1, the first wireless device 101 sends response data indicating failed reception to the external device 20, while the second wireless device 102 does not send feedback data to the external device 20.

In Event 405, in time slot N, both the first wireless device 101 and the second wireless device 102 fail to receive data 201. In time slot N+1, both the first wireless device 101 and the second wireless device 102 send response data indicating failed reception to the external device 20.

In Event 406, in time slot N, the first wireless device 101 fails to receive data 201, but the second wireless device 102 successfully receives data 201. In time slot N+1, the first wireless device 101 sends response data indicating failed reception to the external device 20, while the second wireless device 102 does not send feedback data to the external device 20.

In Event 407, in time slot N, both the first wireless device 101 and the second wireless device 102 successfully receive data 201. In time slot N+1, the first wireless device 101 sends response data indicating successful reception to the external device 20, while the second wireless device 102 does not send feedback data to the external device 20.

In Event 408, in time slot N, the first wireless device 101 successfully receives data 201, but the second wireless device 102 misses the reception of data 201. In time slot N+1, the first wireless device 101 sends response data indicating successful reception to the external device 20, while the second wireless device 102 does not send feedback data to the external device 20.

In Event 409, in time slot N, the first wireless device 101 successfully receives data 201, but the second wireless device 102 fails to receive data 201. In time slot N+1, the first wireless device 101 sends response data indicating successful reception to the external device 20, while the second wireless device 102 sends response data indicating failed reception to the external device 20.

In some embodiments, for raising a transmission success rate for response data indicating failed reception, the transmission power of the wireless device that fails to receive the data in the wireless device group may be increased.

In some embodiments, for collaborative control over the wireless device group 10 and the external device 20, the control data between the wireless device group 10 and the external device 20 may be synchronized after the wireless device group 10 establishes the bidirectional connection to the external device 20 via the group identifier 103.

In some embodiments, using twin Bluetooth® earbuds as an example, the control data may be a play command or a pause command when playing a song. When a user triggers the play command or the pause command on the smart terminal or the twin Bluetooth® earbuds, the control data between the twin Bluetooth® earbuds and the smart terminal may be synchronized to achieve collaborative control over the twin Bluetooth® earbuds and the smart terminal.

In this disclosure, a wireless device group is established and a group identifier for the wireless device group is configured to establish a bidirectional connection between an external device and the wireless device group via the group identifier. Data from the data source may be synchronized to the wireless devices in the wireless device group via the bidirectional connection between the external device and the wireless device group, and thus data synchronization between the wireless devices in the wireless device group may be realized. Also, because the wireless devices in the wireless device group are connected bidirectionally to the external device via the uniform group identifier, each wireless device in the wireless device group may have an equal status. When any of the wireless devices in the group has a failed connection, the communication connections between the other wireless devices in the group and the external device may not be affected. Moreover, it may also lead to more equalized power consumption for each wireless device in the group may also be more equalized.

Figure 8:
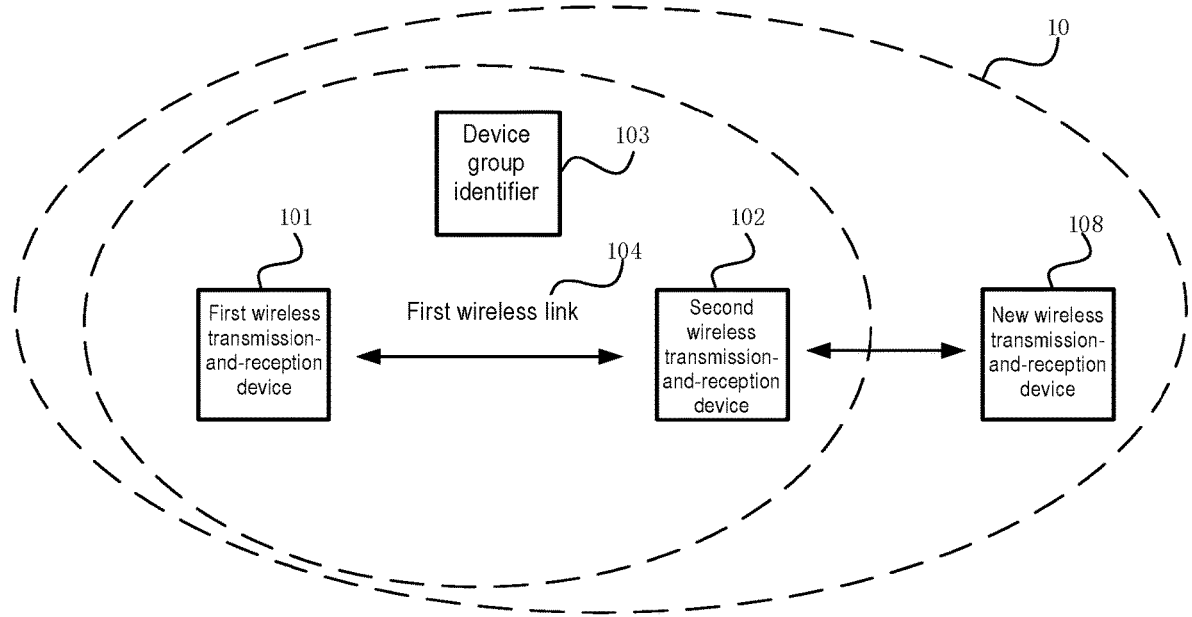
FIG. 8 is a schematic diagram illustrating an exemplary device extension of a wireless group consistent with embodiments of this disclosure.

FIG. 8 is a schematic diagram illustrating example device extension of a wireless device group according to a wireless connection method in an embodiment of this disclosure. As shown in FIG. 8, based on the aforementioned example embodiments, for better extendibility of the number of devices in the wireless device group, a wireless device group may expand from two wireless devices to more devices, by which a mechanism may be configured for adding a wireless device to the wireless device group. In some embodiments, when a first wireless device 101 and a second wireless device 102 have formed a wireless device group 10, a third wireless device 108 may establish a communication connection to any of the wireless devices in the wireless device group 10. The group identifier 103 may be synchronized to the third wireless device 108, and the third wireless device 108 may be added to the wireless device group 10. In some embodiments, after authentication is performed using a present condition between the third wireless device 108 and any of the wireless devices in the wireless device group 10, the third wireless device 108 may join the wireless device group 10 and obtain the group identifier 103. In some embodiments, the authentication may be performed in accordance with a preset standard wireless protocol or a preset private protocol.

In some embodiments, the paired wireless device in the wireless device group 10 may synchronize the group identifier 103 to the third wireless device 108 by broadcasting or via a wireless connection link. For example, the wireless connection link may be implemented by Bluetooth®, Wi-Fi, or other technologies, which is not limited herein.

For better explanation of the extendibility of the wireless connection method provided herein, a detailed description is provided using a specific application scenario (e.g., a group audio conference scenario). Within a range of a work area, a pair of Bluetooth® earbuds may be provided to each conference attender. All of the Bluetooth® earbuds may form a wireless device group, such as a conference audio device group. Via a smart terminal (e.g., a smart phone), a group conference may be implemented on a single smart terminal. When new Bluetooth® earbuds need to join the conference audio device group, they may do so by going through authentication in accordance with a present condition. Thus, the conference audio device group is extendable.

Referring back to FIG. 1, the example embodiment further provides a wireless device group 10, including at least two wireless devices.

In some embodiments, the wireless device group 10 may be connected bidirectionally to an external device via a group identifier 103. The group identifier 103 may be configured for the wireless device group 10 and used for identifying the wireless device group 10.

In an embodiment, the wireless device group 10 may establish a bidirectional connection to an external device via a group identifier 103. The wireless device group 10 may be configured to have the group identifier 103. The group identifier 103 may be used for identifying the wireless device group 10.

In an embodiment, any two wireless devices in the wireless device group 10 may be connected via a preset physical identifier. In some embodiments, the group identifier and the physical identifier may be used in a time-division manner in accordance with a preset air interface protocol.

In an embodiment, a plurality of wireless devices may be paired to form the wireless device group 10. The group identifier 103 may be configured for the wireless device group 10.

In an embodiment, the group identifier 103 may be configured for the wireless device group 10 in accordance with a preset addressing rule.

In an embodiment, each wireless device in the wireless device group 10 may store the group identifier 103.

In an embodiment, the wireless device group 10 may further include a third wireless device. In some embodiments, the third wireless device may be paired with any wireless device in the wireless device group 10. The paired wireless device may synchronize the group identifier 103 to the third wireless device for adding the third wireless device to the wireless device group 10.

In an embodiment, wireless devices in the wireless device group 10 may be connected via a wireless link.

In an embodiment, the wireless devices in the wireless device group 10 may transmit data bidirectionally or unidirectionally via the wireless link.

In an embodiment, a first wireless device 101 in the wireless device group 10 may establish a first bidirectional connection to the external device via the group identifier 103.

In an embodiment, the first wireless device 101 may synchronize link information of the first bidirectional connection to a second wireless device 102 in the wireless device group 10 to cause the second wireless device 102 to establish a second bidirectional connection to the external device.

In an embodiment, the wireless device in the wireless device group 10 may receive the data from the external device. In some embodiments, the wireless devices in the wireless device group 10 may transmit the data to the external device.

In an embodiment, the wireless device in the wireless device group 10 may transmit the data to the external device in accordance with a preset feedback manner.

In an embodiment, the transmitted data may include response data for successful reception or response data for failed reception.

In an embodiment, the first wireless device 101 and the second wireless device 102 in the wireless device group 10 may confirm information about the obtained data. When the second wireless device 102 fails to receive the data source data, the second wireless device 102 may send a retransmission request to the first wireless device 101 to cause the first wireless device 101 to determine whether to retransmit the data to the second wireless device 102 in accordance with a preset response rule. When the first wireless device 101 fails to receive the data source data, the first wireless device 101 may send the retransmission request to the second wireless device 102 to cause the second wireless device 102 to determine whether to retransmit the data to the first wireless device 101 in accordance with the preset response rule.

In an embodiment, a wireless device failing to receive the data in the wireless device group may increase transmission power.

In an embodiment, the wireless device group 10 and the external device may synchronize control data.

In an embodiment, the bidirectional connection may be a bidirectional connection based on a Bluetooth® protocol.

In an embodiment, the wireless device may be a Bluetooth® audio device.

In an embodiment, the Bluetooth® audio device may be a Bluetooth® earbud or a Bluetooth® speaker.

The wireless device group provided by the aforementioned example embodiments may be used to execute the method provided by the aforementioned example method embodiments. The implementations and technical effects are similar, which will not be detailed hereinafter.

Figure 9:
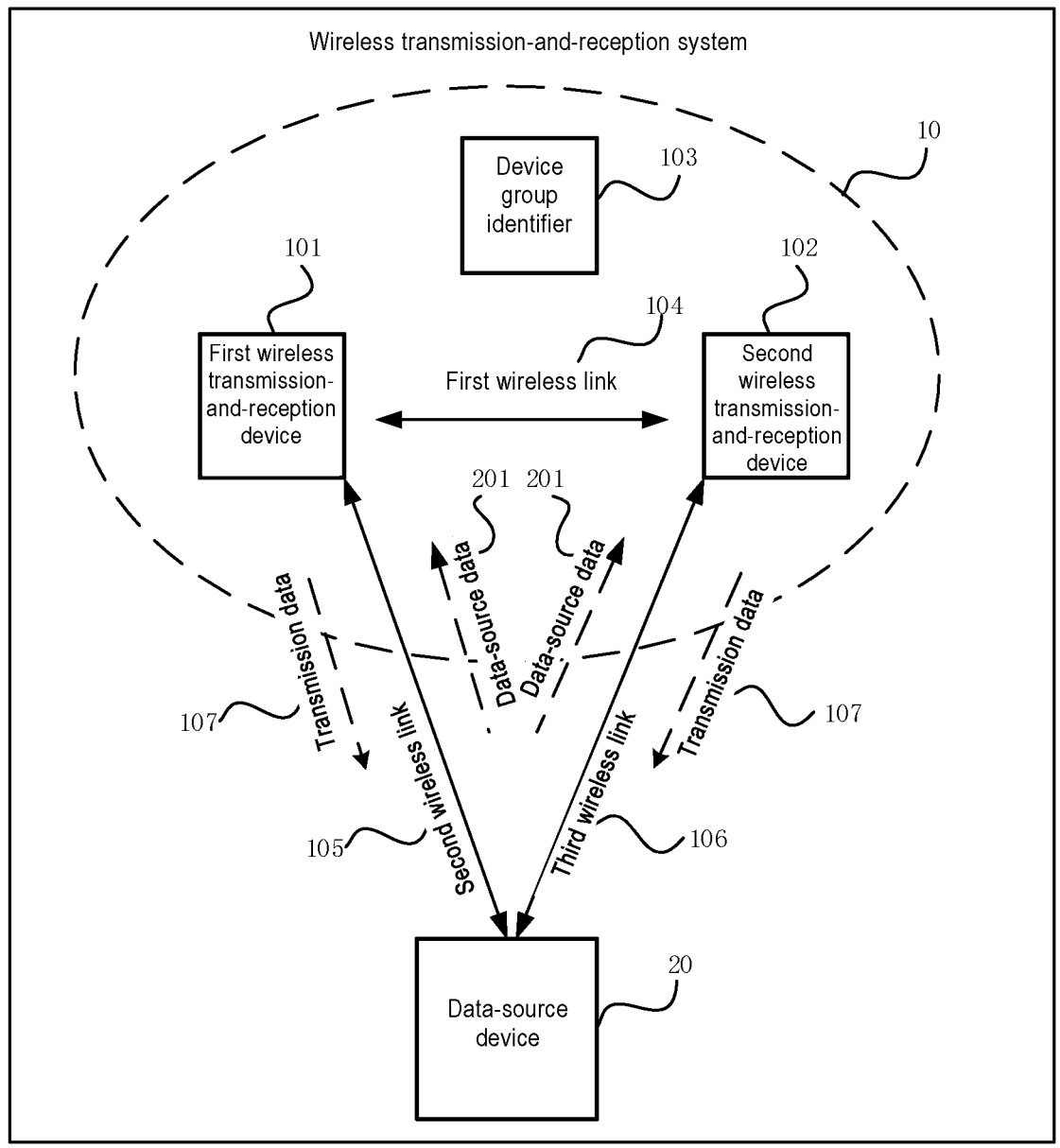
FIG. 9 is a schematic diagram illustrating a wireless connection system consistent with embodiments of this disclosure.

FIG. 9 is a schematic diagram illustrating a wireless connection system according to an embodiment of this disclosure. As shown in FIG. 9, a wireless system provided by this example embodiment includes an external device 20 and a wireless device group 10. In some embodiments, the wireless device group 10 may include at least two wireless devices. In some embodiments, the wireless device group 10 may establish a bidirectional connection to an external device 20 via a group identifier 103. The wireless device group 10 may be configured to have the group identifier 103. The group identifier 103 may be used for identifying the wireless device group 10.

In an embodiment, any two wireless devices in the wireless device group 10 may be connected via a preset physical identifier. In some embodiments, the group identifier and the physical identifier may be used in a time-division manner in accordance with a preset air interface protocol.

In an embodiment, a plurality of wireless devices may be paired to form the wireless device group 10. The group identifier 103 may be configured for the wireless device group 10.

In an embodiment, the group identifier 103 may be configured for the wireless device group 10 in accordance with a preset addressing rule.

In an embodiment, each wireless device in the wireless device group 10 may store the group identifier 103.

In an embodiment, the wireless device group 10 may further include a third wireless device. In some embodiments, the third wireless device may be paired with any wireless device in the wireless device group 10. The paired wireless device may synchronize the group identifier 103 to the third wireless device for adding the third wireless device to the wireless device group 10.

In an embodiment, wireless devices in the wireless device group 10 may be connected via a wireless link.

In an embodiment, the wireless devices in the wireless device group 10 may transmit data bidirectionally or unidirectionally via the wireless link.

In an embodiment, a first wireless device 101 in the wireless device group 10 may establish a first bidirectional connection to the external device 20 via the group identifier 103.

In an embodiment, the first wireless device 101 may synchronize link information of the first bidirectional connection to a second wireless device 102 in the wireless device group 10 to cause the second wireless device 102 to establish a second bidirectional connection to the external device 20.

In an embodiment, the wireless device in the wireless device group 10 may receive the data from the external device 20. In some embodiments, the wireless devices in the wireless device group 10 may transmit the data to the external device 20.

In an embodiment, the wireless device in the wireless device group 10 may transmit the data to the external device 20 in accordance with a preset feedback manner.

In an embodiment, the transmitted data may include response data for successful reception or response data for failed reception.

In an embodiment, the first wireless device 101 and the second wireless device 102 in the wireless device group 10 may confirm information about the obtained data. When the second wireless device 102 fails to receive the data source data, the second wireless device 102 may send a retransmission request to the first wireless device 101 to cause the first wireless device 101 to determine whether to retransmit the data to the second wireless device 102 in accordance with a preset response rule. When the first wireless device 101 fails to receive the data source data, the first wireless device 101 may send the retransmission request to the second wireless device 102 to cause the second wireless device 102 to determine whether to retransmit the data to the first wireless device 101 in accordance with the preset response rule.

In an embodiment, a wireless device failing to receive the data in the wireless device group may increase transmission power.

In an embodiment, the wireless device group 10 and the external device 20 may synchronize control data.

In an embodiment, the bidirectional connection may be a bidirectional connection based on a Bluetooth® protocol.

In an embodiment, the wireless device may be a Bluetooth® audio device.

In an embodiment, the Bluetooth® audio device may be a Bluetooth® earbud or a Bluetooth® speaker.

Embodiments of this disclosure further provides a non-transitory computer-readable storage medium that stores instructions. When being executed by a processor of a device (e.g., the wireless device group), the instructions cause the device to perform any of the aforementioned example method embodiments.

In some embodiments, the computer-readable medium may include a computer storage medium or a communication medium. The communication medium may include any medium that may transmit a computer program from one place to another. The storage medium may be any usable medium that may be accessed by a general-purpose or special-purpose computer. For example, the storage medium may be coupled to a processor to enable the processor to read information from and write information to the storage medium. In some embodiments, the storage medium may also be a component of the processor. In some embodiments, the processor and the storage medium may be located on an application-specific integrated circuit (ASIC). Additionally, the ASIC may be located in a user device. In some embodiments, the processor and the storage medium may also be part of a communication device as discrete components.

It should be noted that the example embodiments above are used only to explain the technical solutions of this disclosure, not to limit them. Notwithstanding the detailed explanation of this disclosure are set forth in reference to the example embodiments above, persons having ordinary skill in the art should understand that they may make changes to the technical solutions described in the above embodiments or replace some or all of the technical features with equivalents. However, those changes or replacements do not cause the nature of the corresponding technical solutions to depart from the scope of the technical solutions illustrated in the embodiments of this disclosure.

The invention claimed is:

1. A method for wireless connection, the method comprises:

establishing a bidirectional connection between a wireless device group and a data source device via a group identifier, the wireless device group comprising at least two wireless devices, the group identifier configured to identify the wireless device group;

connecting two wireless devices in the wireless device group via predetermined physical identifier(s), wherein the group identifier and the physical identifier(s) are used in a time-division manner;

establishing a first bidirectional connection between a first wireless device in the wireless device group and the data source device via the group identifier; and synchronizing, by the first wireless device, link information of the first bidirectional connection to a second wireless device in the wireless device group to cause the second wireless device to establish a second bidirectional connection with the data source device, wherein the first and second wireless devices each monitor and/or receive data transmission from the data source device to the wireless device group using the group identifier;

wherein the first and second wireless devices verify the received data, wherein if the first wireless device did not receive the data successfully, the first wireless device sends a retransmission request to the second wireless device, and the second wireless device may retransmit the data received from the data source device to the first wireless device; and vice versa.

2. The method of claim 1, wherein, before establishing the bidirectional connection between the wireless device group and the data source device via the group identifier, the method further comprises:

pairing a plurality of wireless devices to form the wireless device group, and configuring the group identifier for the wireless device group.

3. The method of claim 2, wherein the configuring the group identifier for the wireless device group comprises:

configuring the group identifier for the wireless device group in accordance with a preset addressing rule.

4. The method of claim 2, wherein, after configuring the group identifier for the wireless device group, the method further comprises:

storing the group identifier by each wireless device in the wireless device group.

5. The method of claim 1, wherein, after establishing the bidirectional connection between the wireless device group and the data source device via the group identifier, the method further comprises:

pairing a third wireless device with any wireless device in the wireless device group; and synchronizing, by the paired wireless device, the group identifier to the third wireless device for adding the third wireless device to the wireless device group.

6. The method of claim 1, wherein wireless devices in the wireless device group are connected via a wireless link.

7. The method of claim 6, wherein the wireless devices in the wireless device group transmit data bidirectionally or unidirectionally via the wireless link.

8. The method of claim 1, wherein, after establishing the bidirectional connection between the wireless device group and the data source device via the group identifier, the method further comprises:

receiving the data from the data source device by the wireless device group; and transmitting the data to the data source device by the wireless device in the wireless device group.

9. The method of claim 8, wherein the transmitting the data to the data source device by the wireless device in the wireless device group comprises:
  transmitting the data to the data source device group in accordance with a preset feedback manner by the wireless device in the wireless device.

10. The method of claim 9, wherein the transmitted data comprises response data for successful reception or response data for failed reception.

11. The method of claim 1, further comprising:
  increasing transmission power of a wireless device failing to receive the data in the wireless device group.

12. The method of claim 1, wherein, after establishing the bidirectional connection between the wireless device group and the data source device via the group identifier, the method further comprises:
  synchronizing control data between the wireless device group and the data source device.

13. The method of claim 1, wherein the bidirectional connection is a bidirectional connection based on a Bluetooth® protocol.

14. The method of claim 13, wherein the wireless device is a Bluetooth® audio device.

15. The method of claim 14, wherein the Bluetooth® audio device is a Bluetooth® earbud or a Bluetooth® speaker.

16. A wireless device group, comprising:
  at least two wireless devices; wherein
  the wireless device group establishes a bidirectional connection to a data source device via a group identifier, the wireless device group being configured to have the group identifier, and the group identifier being used for identifying the wireless device group;
  any two wireless devices in the wireless device group are connected via a preset physical identifier, wherein the group identifier and the physical identifier are used in a time-division manner in accordance with a preset air interface protocol;
  a first wireless device in the wireless device group establishes a first bidirectional connection to the data source device via the group identifier;
  the first wireless device synchronizes link information of the first bidirectional connection to a second wireless device in the wireless device group to cause the second wireless device to establish a second bidirectional connection to the data source device;
  the first wireless device and the second wireless device of the any two wireless devices obtain data by respectively monitoring data transmitted from the data source device to the group identifier;
  the first wireless device and the second wireless device in the wireless device group confirm information about the obtained data;
  when the second wireless device fails to receive the data source data, the second wireless device sends a retransmission request to the first wireless device to cause the first wireless device to determine whether to retransmit the data to the second wireless device in accordance with a preset response rule; and
  when the first wireless device fails to receive the data source data, the first wireless device sends the retransmission request to the second wireless device to cause the second wireless device to determine whether to retransmit the data to the first wireless device in accordance with the preset response rule.

17. The wireless device group of claim 16, wherein a plurality of wireless devices are paired to form the wireless device group and the group identifier is configured for the wireless device group.

18. The wireless device group of claim 17, wherein the group identifier is configured for the wireless device group in accordance with a preset addressing rule.

19. The wireless device group of claim 16, wherein each wireless device in the wireless device group stores the group identifier.

20. The wireless device group of claim 16, further comprising:
  a third wireless device; wherein
  the third wireless device is paired with any wireless device in the wireless device group, wherein the paired wireless device synchronizes the group identifier to the third wireless device for adding the third wireless device to the wireless device group.

21. The wireless device group of claim 16, wherein wireless devices in the wireless device group are connected via a wireless link.

22. The wireless device group of claim 21, wherein the wireless devices in the wireless device group transmit data bidirectionally or unidirectionally via the wireless link.

23. The wireless device group of claim 16, wherein
  the wireless device in the wireless device group receives the data from the data source device; and
  the wireless devices in the wireless device group transmits the data to the data source device.

24. The wireless device group of claim 23, wherein the wireless device in the wireless device group transmits the data to the data source device in accordance with a preset feedback manner.

25. The wireless device group of claim 24, wherein the transmitted data comprises response data for successful reception or response data for failed reception.

26. The wireless device group of claim 16, wherein a wireless device failing to receive the data in the wireless device group increases transmission power.

27. The wireless device group of claim 16, wherein the wireless device group and the data source device synchronize control data.

28. The wireless device group of claim 16, wherein the bidirectional connection is a bidirectional connection based on a Bluetooth® protocol.

29. The wireless device group of claim 28, wherein the wireless device is a Bluetooth® audio device.

30. The wireless device group of claim 29, wherein the Bluetooth® audio device is a Bluetooth® earbud or a Bluetooth® speaker.

31. A system for wireless transmission and reception, comprising:
  a data source device and a wireless device group; wherein
  the wireless device group establishes a bidirectional connection to a data source device via a group identifier, the wireless device group being configured to have the group identifier, and the group identifier being used for identifying the wireless device group;
  any two wireless devices in the wireless device group are connected via a preset physical identifier, wherein the group identifier and the physical identifier are used in a time-division manner in accordance with a preset air interface protocol;
  a first wireless device in the wireless device group establishes a first bidirectional connection to the data source device via the group identifier;

the first wireless device synchronizes link information of the first bidirectional connection to a second wireless device in the wireless device group to cause the second wireless device to establish a second bidirectional connection to the data source device;

the first wireless device and the second wireless device of the any two wireless devices obtain data by respectively monitoring data transmitted from the data source device to the group identifier;

the first wireless device and the second wireless device in the wireless device group confirm information about the obtained data;

when the second wireless device fails to receive the data source data, the second wireless device sends a retransmission request to the first wireless device to cause the first wireless device to determine whether to retransmit the data to the second wireless device in accordance with a preset response rule; and when the first wireless device fails to receive the data source data, the first wireless device sends the retransmission request to the second wireless device to cause the second wireless device to determine whether to retransmit the data to the first wireless device in accordance with the preset response rule.

32. The system of claim 31, wherein a plurality of wireless devices are paired to form the wireless device group and the group identifier is configured for the wireless device group.

33. The system of claim 32, wherein the group identifier is configured for the wireless device group in accordance with a preset addressing rule.

34. The system of claim 31, wherein each wireless device in the wireless device group stores the group identifier.

35. The system of claim 31, further comprising:
a third wireless device; wherein
the third wireless device is paired with any wireless device in the wireless device group, wherein the paired wireless device synchronizes the group identifier to the third wireless device for adding the third wireless device to the wireless device group.

36. The system of claim 31, wherein wireless devices in the wireless device group are connected via a wireless link.

37. The system of claim 36, wherein the wireless devices in the wireless device group transmit data bidirectionally or unidirectionally via the wireless link.

38. The system of claim 31, wherein
the wireless device in the wireless device group receives the data from the data source device; and
the wireless devices in the wireless device group transmits the data to the data source device.

39. The system of claim 38, wherein the wireless device in the wireless device group transmits the data to the data source device in accordance with a preset feedback manner.

40. The system of claim 39, wherein the transmitted data comprises response data for successful reception or response data for failed reception.

41. The system of claim 31, wherein a wireless device failing to receive the data in the wireless device group increases transmission power.

42. The system of claim 31, wherein the wireless device group and the data source device synchronize control data.

43. The system of claim 31, wherein the bidirectional connection is a bidirectional connection based on a Bluetooth® protocol.

44. The system of claim 43, wherein the wireless device is a Bluetooth® audio device.

45. The system of claim 44, wherein the Bluetooth® audio device is a Bluetooth® earbud or a Bluetooth® speaker.

46. A non-transitory computer-readable storage medium having stored thereon instructions that, when executed by a processor of a device, cause the device to perform a method of:
establishing a bidirectional connection between a wireless device group and a data source device via a group identifier, the wireless device group comprising at least two wireless devices, the wireless device group being configured to have the group identifier, and the group identifier being used for identifying the wireless device group;
connecting any two wireless devices in the wireless device group via a preset physical identifier, wherein the group identifier and the physical identifier are used in a time-division manner in accordance with a preset air interface protocol;
establishing a first bidirectional connection between a first wireless device in the wireless device group and the data source device via the group identifier;
synchronizing, by the first wireless device, link information of the first bidirectional connection to a second wireless device in the wireless device group to cause the second wireless device to establish a second bidirectional connection to the data source device; and
obtaining data by respectively monitoring data transmitted from the data source device to the group identifier by the first wireless device and the second wireless device of the any two wireless devices;
wherein, after a wireless device in the wireless device group transmitting data to the data source device, the method further comprises:
confirming information about the obtained data by the first wireless device and the second wireless device in the wireless device group;
when the second wireless device fails to receive the data source data, sending a retransmission request by the second wireless device to the first wireless device to cause the first wireless device to determine whether to retransmit the data to the second wireless device in accordance with a preset response rule; and
when the first wireless device fails to receive the data source data, sending the retransmission request by the first wireless device to the second wireless device to cause the second wireless device to determine whether to retransmit the data to the first wireless device in accordance with the preset response rule.

* * * * *